W. E. GOODYEAR.
SHOCK ABSORBER.
APPLICATION FILED SEPT. 19, 1913.

1,268,452.

Patented June 4, 1918.

Witnesses:
Carl L. Choate
Llewellyn Richards

Inventor:
Watson E. Goodyear,
by Emery, Booth, Janney & Varney
Attys.

UNITED STATES PATENT OFFICE.

WATSON E. GOODYEAR, OF PHILADELPHIA, PENNSYLVANIA.

SHOCK-ABSORBER.

1,268,452.

Specification of Letters Patent.   Patented June 4, 1918.

Application filed September 19, 1913.   Serial No. 790,774.

*To all whom it may concern:*

Be it known that I, WATSON E. GOODYEAR, a citizen of the United States, and resident of Philadelphia, Pennsylvania, have invented an Improvement in Shock-Absorbers, of which the following description, in connection with the accompanying drawings, is a specification, like characters on the drawings representing like parts.

This invention relates to shock absorbers for vehicles and other uses.

The character of the invention may be best understood by reference to the following description of an illustrative embodiment thereof shown in the accompanying drawing wherein:—

Figure 1:
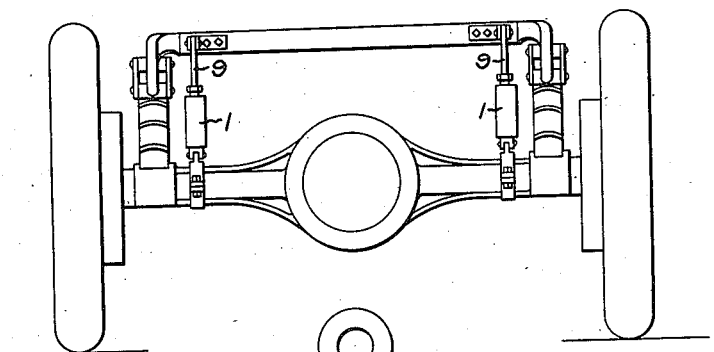
Figure 2:
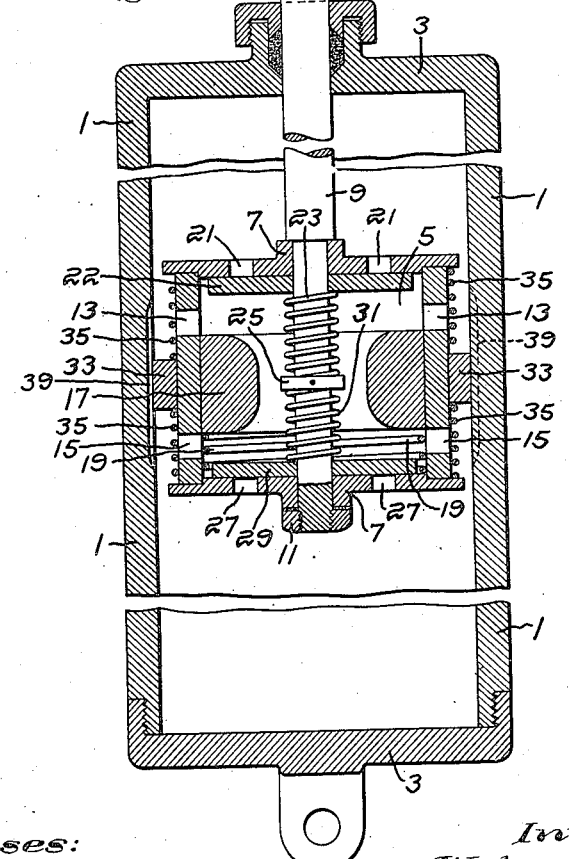

Figure 1 is a rear elevation of a motor car equipped with shock absorbers embodying the invention; and Fig. 2 is a vertical longitudinal section through one of the shock absorbers shown in Fig. 1.

Referring to the drawing the illustrative shock absorber shown therein as embodying the invention comprises a cylinder or other appropriately shaped chamber 1 having heads 3, 3, one of which may be suitably connected to the running gear of a vehicle.

Within the cylinder is a hollow plunger 5 preferably having a cylindrical wall and heads 7, 7 apertured to receive a rod 9 secured to said plunger by a set nut 11. The plunger rod projects through one of the heads of the cylinder and may be connected to the body of the vehicle by any appropriate connections.

The cylinder 1 may contain some heavy liquid such as oil or glycerin. To permit this liquid to pass through the plunger and be controlled in its passage the cylindrical wall of the plunger is provided with two or more ports 13 adjacent one head of said plunger and two or more ports 15 adjacent the opposite head of said plunger. To control the passage of the liquid through said ports the plunger is provided with a weighted floating piston valve 17 having a sliding fit therein and centrally hollowed out to permit the passage of the liquid therethrough. To contribute to the support of said weighted valve a helical spring 19 is interposed between the same and the lower head of the plunger. A similar spring may be placed between said valve and the opposite head of the plunger if desired.

To further control the passage of the liquid through the plunger the upper head of the latter is provided with ports 21 controlled by a disk valve 22 apertured to slide on the plunger rod 9 and pressed toward the head of the plunger by a spring 23 encircling said rod and limited by a ring 25 fast on the latter. The lower head is provided with similar ports 27 controlled by a disk valve 29 normally pressed against said head by a spring 31 also encircling said rod and limited by said ring.

Preferably the plunger does not fit close to the inner wall of the cylinder, but is spaced therefrom somewhat to receive a ring 33 loose on said plunger and normally maintained centrally between the heads of said plunger by helical springs 35 bearing against outer rims of the plunger heads. To permit a restricted passage of the liquid to and from opposite sides of said ring the inner wall of the cylinder may be provided centrally between its ends with a series of longitudinal channels 39.

In operation, so long as the body of the vehicle remains vertically stationary or moves only immaterially there will be slight, if any, movement of the plunger and substantially no effect upon the weighted valve within the plunger, because the plunger being connected to the body also is substantially stationary. When, however, the body starts to move downwardly it will so move with an acceleration by reason of which the weighted valve will lag and partially close the upper plunger ports 13. This will restrict the flow of the liquid through the plunger and thereby check the movement of the plunger and body.

Reversely, if the body starts to move upwardly it will so move with an acceleration such that the weighted valve will lag in the upward movement of the plunger and partially close the lower ports 15, thereby again restricting the flow of liquid through the plunger and checking the upward movement of the latter.

When the springs of the vehicle exactly balance the weight of the body of the vehicle they are in a relation which may be referred to as the neutral point. In the downward movement of the body and plunger after the neutral point has been reached the velocity downward is subject to a negative acceleration (that is, the body slows up after passing the neutral point), with the result that the inertia of the downward movement of the weight 17 causes it to overtake the plunger and partially close the lower ports 15 during this slowing up of the plunger. Under these conditions the lower disk valve 29 and ports 27 serve as a sort of release to avoid transmitting any substantial shock to the plunger and thence to the vehicle body. Similarly as the body and plunger are moving upwardly from some point below the neutral point the velocity is first positively accelerated up to the neutral point so that the weighted valve lags and partially closes the lower ports. After the neutral point has been reached the velocity of the body and piston are subject to negative acceleration and again the weighted valve overtakes the plunger and partially closes the upper ports. Under these circumstances the upper disk valve 22 and ports 21 serve as a sort of release to avoid transmitting any substantial shock to the plunger and body.

The longitudinal channels 39 may be proportioned to permit a free flow to and from the chambers at the opposite sides of the plunger than is permitted by the more indirect passage through the plunger. As a result they will coöperate with the plunger ring 33 and tend to prevent any objectionably sudden jolt on the plunger.

The plunger and cylinder coöperate upon a dash-pot principle with a passage connecting the cylinder chambers at opposite sides of the plunger constricted more or less by said floating valve. This passage is typefied herein by the passage afforded through the plunger and its ports although the passage might be otherwise embodied within the spirit of the invention. The floating weight is constructed and arranged to participate, subject to its inertia, in the movement of the plunger, but does not participate in the movement of the cylinder.

The springs for the check disk valves 22 and 29 should be comparatively light and only strong enough to hold them seated under ordinary working conditions.

From the above description it will be apparent that the floating weighted valve within the plunger is responsive to the movements of the body and plunger in such a manner as to furnish a highly desirable variable throttling of the plunger ports to properly check abnormal movements of the body. It will permit a substantially free flow of liquid through the plunger when the vehicle is traveling over smooth roads but checks the vibration of the body when the vehicle is passing over irregularities or rough roads. As a result the vehicle springs are effectively protected against breaking.

Having described one illustrative embodiment of the invention without limiting the same thereto, what I claim as new and desire to secure by Letters Patent is:

1. A shock absorber comprising two movable elements, and means governed solely by one of the elements for checking abnormal movement thereof.

2. A shock absorber comprising two movable elements, and means governed solely by one of the elements for checking abnormal movement thereof in opposite directions.

3. A shock absorber comprising two movable elements, and means governed solely by the movement of one of said elements, for checking abnormal movement thereof toward and from the companion element.

4. A shock absorber comprising two movable elements, and checking means interposed between the elements, one of the elements on its movements being inactive upon the checking means, and means governed by the motion of the other element, for causing the action of the checking means on abnormal movement of said other element.

5. A shock absorber comprising two movable elements, one consisting of a cylinder and the other of a piston, the cylinder having means therein for the circulation of liquid on the relative movement of said elements, and means governed solely by one of the elements for checking said circulation on the relative movement of the elements, the other element being inactive upon the checking means.

6. A shock absorber comprising an element connectible with the body of a vehicle for movement therewith, a second element connectible and movable with the axle of the vehicle, and means interposed between the two elements and governed solely by the body connected element, for checking abnormal movement thereof, the axle connected element being inactive upon the checking means.

7. A shock absorber comprising an element rigidly connectible with the body of a vehicle, a second element connectible with the axle of the vehicle for movement therewith, and means interposed between the elements and governed solely by the body connected element for checking abnormal movement of said body connected element, the axle connected element being inactive upon the checking means.

8. A shock absorber comprising, in combination, a chamber; a plunger therein having provision permitting the passage of liquid therethrough; and a ring interposed between said plunger and chamber and movable relatively to said plunger.

9. A shock absorber comprising, in combination, a chamber; a plunger therein spaced from the inner wall of said chamber; a ring interposed between said plunger and said wall; and spring means for opposing relative movement between said ring and plunger.

10. A shock absorber comprising, in combination, a cylinder having recesses in the inner wall thereof; a plunger in said cylinder spaced from said wall; and a ring interposed between said plunger and wall for controlling the passage of liquid from one side of said plunger through said recesses to the other side of said plunger.

11. A shock absorber comprising, in combination, a cylinder for connection with the running gear of a vehicle; a hollow plunger in said cylinder for connection with the body of the vehicle; ports in said plunger permitting the passage of liquid from one side of said plunger to the opposite side thereof; and a weighted floating valve within said plunger for automatically throttling said ports.

12. A shock absorber comprising, in combination, a cylinder and plunger adapted to coöperate upon a dash-pot principle; means providing a passage connecting the cylinder chambers at opposite sides of the plunger; and means for constricting more or less said passage including a floating weight in said cylinder constructed to participate, subject to its inertia, in the movement of only one of said dash-pot parts.

13. In a shock absorber, a fluid-containing casing and a member working therein, said parts being arranged for independent movement of one relative to the other, there being provision for flow of fluid between opposite sides of said member, and means responsive to acceleration of one only of said parts to throttle the flow of fluid.

14. The combination with a shock receiving element and an element to be cushioned relatively thereto, of a fluid-containing casing and a ported member working therein and coöperating therewith to act as a dash pot, said casing being connected to said shock receiving element to move therewith independently of movement of said cushioned element and said member being connected to said cushioned element to move therewith independently of movement of the shock receiving element, and means associated with said ported member actuable by acceleration only of said member to throttle the passage of fluid through the ports.

15. The combination with two elements to be relatively cushioned, of a shock absorber comprising a fluid-containing casing and member working therein, there being provision for flow of fluid between opposite sides of said member whereby the parts coöperate to act as a dash pot, said parts being connected to said elements respectively each to partake of movement of one independently of movement of the other, and means associated with one of said parts and by its inertia responsive to movement thereof to throttle the flow of fluid.

16. A shock absorber comprising, in combination, a fluid containing chamber; a hollow plunger therein having ports communicating with said chamber; and a floating valve in said plunger normally between said ports and automatically movable to control the passage through said ports.

17. A shock absorber comprising, in combination, a fluid containing chamber; a hollow plunger therein having port means communicating with said chamber; and a spring pressed floating piston valve in said plunger for automatically throttling said port means.

18. A shock absorber comprising, in combination, a fluid containing chamber; a hollow plunger therein having port means communicating with said chamber; and a weighted floating piston valve in said plunger automatically movable relatively to the latter for controlling the passage through said port means.

19. A shock absorber comprising, in combination, a liquid containing chamber; a hollow plunger therein having ports communicating with said chamber; and a floating valve within said plunger movable to throttle said ports and having provision permitting the passage of liquid therethrough.

20. A shock absorber comprising, in combination, a fluid containing chamber; a plunger therein having a side wall and heads; ports in said wall and heads for communication with said chamber; a floating valve in said plunger for throttling the ports in said wall; and valve means for controlling the passage through the ports in said heads.

21. A shock absorber comprising, in combination, a fluid containing chamber; a hollow plunger therein having heads and a cylindrical wall; ports in said heads and wall; a rod for said plunger; disk valves mounted on said rod for controlling the ports in said heads; and a floating valve in said plunger automatically movable between said heads for throttling the ports in said cylindrical wall.

22. A shock absorber comprising, in combination, a fluid containing chamber; a plunger therein having heads and a cylindrical wall; ports in said heads and wall; disk valves; spring means for pressing said valves toward said heads over the ports therein; a floating weighted valve reciprocable in said plunger for controlling the ports in the cylindrical wall of said plunger; and spring means contributing to the control of said weighted valve.

In testimony whereof, I have signed my name to this specification, in the presence of two subscribing witnesses.

WATSON E. GOODYEAR.

Witnesses:
LAURENCE A. JANNEY,
HENRY T. WILLIAMS.